United States Patent Office 3,513,224
Patented May 19, 1970

---

3,513,224
MAR-RESISTANT POLYESTER RESINS
Allan Ellis Sherr, Martinsville, N.J., assignor to American Cyanamid Company, Stamford, Conn., a corporation of Maine
No Drawing. Filed Apr. 25, 1968, Ser. No. 724,288
Int. Cl. C08f 21/02
U.S. Cl. 260—872                               3 Claims

ABSTRACT OF THE DISCLOSURE

A polyester resin composition composed of (1) the esterification reaction product of fumaric acid, triethylene glycol and 2,2-dimethyl-1,3-propanediol, (2) styrene and (3) an ethylene glycol dimethacrylate and lenses produced therefrom, are disclosed.

BACKGROUND OF THE INVENTION

Polyester resin compositions similar to those disclosed herein have been the subject of various U.S. Patents, see, for example, U.S. Pat. Nos. 3,264,372; 3,265,763; 3,265,-764; 3,294,867; 3,318,975. The properties of the resins of said patents are excellent for the purposes disclosed, however, the resins are usually not of sufficient quality to enable them to be used for the production of high grade optical lenses. I have now discovered a specific polyester resin system which may be utilized, as such, in the production of optical lenses. My novel system can be formed into lenses which are haze-free, transparent (optically clear), grindable, shatter-resistant and mar-resistant and additionally, the lenses are not brittle and have a refractive index ($n_D^{25}$) of greater than 1.5 and approaching that of optical quality glass. This unique combination of properties cannot be found in resin systems known in the prior art.

SUMMARY

As mentioned above, my novel compositions are useful in the production of lenses. These lenses can be used in instruments such as binoculars, telescopes, microscopes, etc. but are more particularly useful as ophthalmic lenses such as in eyeglasses, industrial safety glasses, sunglasses, etc.

DESCRIPTION OF THE INVENTION INCLUDING PREFERRED EMBODIMENTS

The compositions of the instant invention are composed of (1) from about 70.0% to about 75.0% of the esterification reaction product of fumaric acid, triethylene glycol and from about 5.0% to about 15.0%, based on the OH content of the triethylene glycol, of 2,2-dimethyl-1,3-propanediol, otherwise known as neopentyl glycol, (2) from about 12.0% to about 18.0% of styrene and (3) from about 8% to about 12.0% of an ethylene glycol dimethacrylate, said percentages being by weight, based on the total weight of (1), (2) and (3).

The esterification reaction product of the fumaric acid, triethylene glycol and neopentyl glycol is produced by merely reacting the components, under known conditions, in equimolar amounts of acid and alcohol or from about a 5% to 20% excess of alcohol over that amount stoichiometrically calculated to esterify the carboxyl groups of the acid. The esterification should only be carried out, however, until an acid number of below about 30, preferably between about 5 and about 30, is achieved.

The second component (2) of my novel compositions is styrene. This component is present in the amounts mentioned above as a mixture with component (1) until the ultimate composition is converted to the thermoset state. The high concentration of styrene aids in producing an ultimate resin having a refractive index approaching that of optical glass, i.e., 1.52.

The third component (3) of my novel composition is an ethylene glycol dimethacrylate. This component is also present in the initial, formable composition as a mixture with (1) and (2). The ethylene glycol dimethacrylate functions so as to reduce the cross-linking density, and therefore the brittleness, of the ultimate thermoset system caused by the high styrene content. The composition in this condition can then be formed into a lens having the properties mentioned above. Examples of useful compounds include ethylene glycol dimethacrylate, diethylene glycol dimethacrylate, triethylene glycol dimethacrylate, tetraethylene glycol dimethacrylate, etc.

The conversion of the thermosetting mixture to the thermoset composition can be accomplished by the application of heat and/or pressure with or without catalysis. Alternatively, the thermosetting material can be converted to the thermoset state by use of catalysts or initiators only, without resorting to either heat or pressure. The catalytic materials or polymerization initiators which may be used to make such a conversion in state are well-known in the art and have been used extensively for this purpose. Illustrative catalysts include the peroxide catalysts, such as, benzoyl peroxide, tertiary butyl hydroperoxide, ditertiary butyl peroxide, and cumene hydroperoxide, among many others. The ketone peroxides may also be used, such as, the methyl ethyl ketone peroxide, the diethyl ketone peroxide and the like. The amount of the catalytic material used is conventional, i.e., between about 0.01% and 10%, and more, usually between about 0.1% and 3%, by weight, based on the weight of the total weight of (1), (2) and (3).

As can be ascertained from a perusal of the above cited patents. It is known that the addition of glycol diacrylates, although increasing some properties of the resultant composition such as impact strength, results in the reduction of other properties. Similarly, high amounts of styrene are known to increase the refractive index of the resultant resin but the addition of styrene also creates an extensive network of cross-linking and therefore increases the brittleness of the system. I have now found, as briefly mentioned above, that the combination of the styrene and the ethylene glycol dimethacrylate, when used in the above concentrations, not only individually give to the ultimate composition their known attributes, but act beneficially on one another so that the dimethacrylate reduces the cross-linking caused by the styrene while still adding its own benefit to the system and, additionally, not reducing the refractive index increasing benefit caused by the styrene.

If desired, the compositions of the present invention may have incorporated therein, materials which do not function so as to destroy the properties above discussed. For example, ultraviolet light absorbers, photochromic materials, dyes, pigments, mold release agents, foam reducing agents, etc. may be added in amounts such that they function as desired without destroying other existing or more desirable characteristics of the basic system.

The following examples are set forth for purpose of illustration only and are not meant to be construed as limitations on the present invention except as set forth in the appended claims. All parts and percentages are by weight unless otherwise specified.

POLESTER RESIN A

Into a suitable reaction vessel equipped with thermometer, stirrer and inert gas inlet and outlet tubes, are introduced 47.0 parts of triethylene glycol, 44.5 parts of fumaric acid and 8.5 parts of 2,2-dimethyl-1,3-propanediol. The charge is heated at about 150° C. to 200° C. for 28 hours while bubbling carbon dioxide through the reaction mixture so as to provide an inert atmosphere. At the end of the reaction period, a light yellow viscous product having an acid number of 28 is recovered.

Example 1

Into a suitable mixing vessel are charged 72.25 parts of "Resin A," 15 parts of styrene and 10 parts of tetraethylene glycol dimethacrylate. The charge is thoroughly blended and is then catalyzed by the addition of 2.0 parts of t-butyl peroctate. The resulting composition is then poured into a casting cell composed of two 75 mm. diameter glass plates having a 6 base radius of curvature and sealed by a flexible gasket. The cell is then placed into an oven and heated at 60° C. for 16 hours and 100° C. for 90 minutes. After further gradual heating to 135° C. the cell is removed and opened. A clear transparent lens of 6 base curvature having a Barcol Hardness of 31 and a refractive index ($n_D^{25}$) of 1.5248. The lens is useful, as such, or as a grindable lens for eyeglasses.

Example 2

Following the procedure of Example 1, various compositions are produced with the following formulations of polyester resin, styrene and ethylene glycol dimethacrylate. In each instance, curing of the mixture, (remaining amount being catalyst) in a lens-shaped cell results in articles of manufacture with properties substantially equivalent to those of the product of Example 1.

2(a) A mixture of 70.0 parts of a polyester composed of fumaric acid, triethylene glycol and 5% of 2,2-dimethyl-1,3-propanediol having an acid number of 16, 12 parts of styrene and 8 parts of tetraethylene glycol dimethacrylate. Mixture of 0.05 part of isopropyl percarbonate and 2.0 parts of t-butyl peroctoate used as catalyst instead of the peroctoate alone.

2(b) A mixture of 75.0 parts of a polyester composed of fumaric acid, triethylene glycol and 15% of 2,2-dimethyl-1,3-propanediol, acid No. 27, 18 parts of styrene and 12 parts of tetraethylene glycol dimethacrylate. 3.5 parts of catalyst used.

2(c) Same mixture of ingredients as Example 1 except that 10 parts of triethylene glycol dimethacrylate used instead of tetraethylene glycol dimethacrylate.

2(d) Same mixture of ingredients as Example 1 except that 10 parts of diethylene glycol dimethacrylate used instead of tetraethylene glycol dimethacrylate.

2(e) Same mixture of ingredients as Example 1 except that 10 parts of ethylene glycol dimethacrylate used instead of tetraethylene glycol dimethacrylate.

The lenses of Examples 1–2(e) were ground down by an optician to a lens having a prescription of +1.0−.75L and +1.25−.62R, inserted into eyeglass frames and fitted to a wearer. The glasses satisfactorily corrected the vision of the wearer.

I claim:
1. A composition of matter consisting essentially of a blend of (1) from about 70.0% to about 75.0% of the esterification reaction product of reactants consisting essentially of fumaric acid, triethylene glycol and 5–15%, by weight, based on the OH content of the triethylene glycol, of 2,2-dimethyl-1,3-propanediol, wherein said product has an acid number between about 5 and about 30, (2) from about 12.0% to about 18.0% of styrene and (3) from about 8.0% to about 12.0% of an ethylene glycol dimethacrylate, said percentages being by weight, based on the total weight of (1), (2) and (3).
2. The composition of claim 1 in a cured, cross-linked state.
3. An ophthalmic lens produced from the composition of claim 2.

References Cited

UNITED STATES PATENTS

| 3,042,651 | 7/1962 | Martens | 260—872 |
| 3,264,372 | 8/1966 | Deichert et al. | 260—872 |
| 3,265,763 | 8/1966 | Deichert et al. | 260—872 |
| 3,265,764 | 8/1966 | Deichert et al. | 260—872 |
| 3,294,867 | 12/1966 | Bristol et al. | 260—868 |
| 3,318,975 | 5/1967 | Deichert et al. | 260—872 |
| 3,333,023 | 7/1967 | Bristol et al. | 260—872 |
| 3,391,224 | 7/1968 | Sherr et al. | 260—872 |
| 3,431,321 | 3/1969 | De Lapp et al. | 260—872 |

WILLIAM SHORT, Primary Examiner

M. GOLDSTEIN, Assistant Examiner

U.S. Cl. X.R.

351—159, 177